United States Patent
Scheepens et al.

(10) Patent No.: US 10,586,513 B2
(45) Date of Patent: Mar. 10, 2020

(54) SIMULTANEOUSLY DISPLAYING VIDEO DATA OF MULTIPLE VIDEO SOURCES

(71) Applicant: KONINKLIJKE PHILIPS N.V., Eindhoven (NL)

(72) Inventors: Jeroen Gerard Scheepens, Best (NL); Ivo Don Stuyfzand, Eindhoven (NL); Hendrikus Bernardus Van Den Brink, Eindhoven (NL); Jurgen Jean Louis Hoppenbrouwers, Boxtel (NL); Petrus Johannes Gerardus Mentjox, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 526 days.

(21) Appl. No.: 15/022,593

(22) PCT Filed: Sep. 25, 2014

(86) PCT No.: PCT/EP2014/070421
§ 371 (c)(1),
(2) Date: Mar. 17, 2016

(87) PCT Pub. No.: WO2015/044236
PCT Pub. Date: Apr. 2, 2015

(65) Prior Publication Data
US 2016/0240170 A1    Aug. 18, 2016

(30) Foreign Application Priority Data
Sep. 27, 2013    (EP) .................................... 13186309

(51) Int. Cl.
*G09G 5/14* (2006.01)
*H04N 5/445* (2011.01)

(52) U.S. Cl.
CPC ........... *G09G 5/14* (2013.01); *H04N 5/44591* (2013.01); *G09G 2340/045* (2013.01); *G09G 2354/00* (2013.01); *G09G 2380/08* (2013.01)

(58) Field of Classification Search
CPC ............................ G09G 5/14; H04N 5/44591
See application file for complete search history.

(56) References Cited

U.S. PATENT DOCUMENTS 5,287,189 A * 2/1994 Ersoz ..................... H04N 5/45
                                                     348/441
5,331,419 A   7/1994 Yamada
(Continued)

FOREIGN PATENT DOCUMENTS

EP    0156116 A2    10/1985
EP    0991265 A2    4/2000
(Continued)

OTHER PUBLICATIONS

Knight, K. "Responsive web design: what it is and how to use it", Smashing Magazine. Jan. 12, 2011.

*Primary Examiner* — Brian P Yenke

(57) ABSTRACT

A system is provided for simultaneously displaying video data of multiple video sources (040, 042) on a display. The system comprises a video input (120) for receiving the video data (122) of the multiple video sources; a display processor (140) for generating display data (142) to display the video data of the multiple video sources in respective viewports (1A-2F) on a display. The display processor is further arranged for, if needed to fit respective ones of the viewports, spatially scaling the video data of one or more of the multiple video sources to obtain said fit; and generating a visual indicator (300-320) for visually indicating whether the video data in one of the viewports has been spatially scaled from its native spatial resolution. By providing the visual indicator as part of the display data, the system may (Continued)

warn the user that the video data in one of the viewports may comprise undesirable artifacts which may hinder interpretation of the video data.

18 Claims, 5 Drawing Sheets

(56) References Cited

U.S. PATENT DOCUMENTS

| | | | | |
|---|---|---|---|---|
| 5,442,406 | A * | 8/1995 | Altmanshofer | H04N 3/223 348/445 |
| 5,699,535 | A * | 12/1997 | Amro | G06F 3/0481 345/660 |
| 5,712,995 | A * | 1/1998 | Cohn | G06F 3/0481 715/792 |
| 5,757,371 | A * | 5/1998 | Oran | G06F 3/0482 715/779 |
| 5,815,216 | A * | 9/1998 | Suh | H04N 5/45 348/565 |
| 5,940,077 | A * | 8/1999 | Amro | G06F 3/0481 715/800 |
| 6,137,539 | A * | 10/2000 | Lownes | H04N 5/44513 348/569 |
| 6,204,887 | B1 * | 3/2001 | Hiroi | G09G 5/14 348/565 |
| 6,295,388 | B1 | 9/2001 | Stokes et al. | |
| 6,678,009 | B2 * | 1/2004 | Kahn | H04N 5/21 348/569 |
| 6,690,425 | B1 * | 2/2004 | Worrell | H04N 7/0122 348/445 |
| 6,714,253 | B2 * | 3/2004 | Kim | H04N 5/4401 348/554 |
| 6,714,888 | B2 * | 3/2004 | Mori | G01R 19/2509 324/762.02 |
| 6,738,559 | B1 * | 5/2004 | Yoo | H04N 5/775 386/230 |
| 6,791,578 | B1 * | 9/2004 | Ubillos | G09G 5/391 348/E5.111 |
| 6,798,458 | B1 * | 9/2004 | Unemura | H04N 7/012 348/443 |
| 6,848,792 | B1 * | 2/2005 | De Meerleer | G06F 3/1446 348/E5.104 |
| 7,119,849 | B2 * | 10/2006 | Yui | G06F 3/14 345/660 |
| 7,206,029 | B2 * | 4/2007 | Cohen-Solal | H04N 5/45 345/629 |
| 7,224,404 | B2 * | 5/2007 | An | H04N 5/4401 345/204 |
| 7,596,188 | B2 * | 9/2009 | Gotanda | H04N 5/4401 370/313 |
| 7,616,264 | B1 * | 11/2009 | Greenberg | H04N 5/445 348/564 |
| 7,792,999 | B2 * | 9/2010 | Fujimoto | H04N 1/393 709/203 |
| 8,054,241 | B2 * | 11/2011 | Muklashy | G06F 3/1423 345/1.1 |
| 8,164,600 | B2 * | 4/2012 | Ramon | G06T 3/40 345/606 |
| 8,229,272 | B2 * | 7/2012 | Suh | H04N 5/85 348/553 |
| 8,982,145 | B2 * | 3/2015 | Hernandez | G06F 8/38 345/581 |
| 2002/0075407 | A1 * | 6/2002 | Cohen-Solal | H04N 5/45 348/565 |
| 2002/0089549 | A1 | 7/2002 | Munro et al. | |
| 2003/0002862 | A1 * | 1/2003 | Rodriguez | H04N 7/17318 386/234 |
| 2003/0009722 | A1 * | 1/2003 | Sugiyama | H04N 19/70 714/779 |
| 2003/0197739 | A1 * | 10/2003 | Bauer | G06F 3/0481 715/800 |
| 2004/0017393 | A1 | 1/2004 | Easwar | |
| 2004/0090556 | A1 * | 5/2004 | Kamieniecki | H04N 7/0122 348/558 |
| 2004/0148640 | A1 * | 7/2004 | Masukura | H04N 7/16 725/135 |
| 2004/0210847 | A1 * | 10/2004 | Berson | G01D 7/08 715/788 |
| 2004/0212731 | A1 * | 10/2004 | Sie | H04N 7/0122 348/445 |
| 2007/0052851 | A1 * | 3/2007 | Ochs | H04N 5/44513 348/556 |
| 2007/0201833 | A1 * | 8/2007 | Cherna | H04N 5/91 386/230 |
| 2007/0248324 | A1 * | 10/2007 | Itani | G11B 20/10 386/230 |
| 2007/0250788 | A1 * | 10/2007 | Rigolet | G06F 3/0481 715/788 |
| 2008/0034317 | A1 * | 2/2008 | Fard | G06F 3/0481 715/781 |
| 2008/0060047 | A1 * | 3/2008 | Holliday | H04H 20/08 725/139 |
| 2008/0092054 | A1 | 4/2008 | Bhumkar et al. | |
| 2008/0150966 | A1 | 6/2008 | Wang | |
| 2008/0309821 | A1 * | 12/2008 | Kim | G06F 3/14 348/563 |
| 2009/0063561 | A1 * | 3/2009 | Sayko | G06F 17/30038 |
| 2009/0228922 | A1 | 9/2009 | Haj-Khalil et al. | |
| 2009/0256862 | A1 | 10/2009 | Rassel et al. | |
| 2011/0087982 | A1 * | 4/2011 | McCann | G06F 3/0481 715/769 |
| 2011/0087989 | A1 * | 4/2011 | McCann | G06F 3/04817 715/772 |
| 2011/0302528 | A1 * | 12/2011 | Starr | G06F 3/0481 715/800 |
| 2012/0069040 | A1 * | 3/2012 | Nakasu | G06T 3/0012 345/589 |
| 2012/0075526 | A1 * | 3/2012 | DeHaan | H04N 5/445 348/445 |
| 2013/0069946 | A1 | 3/2013 | Venon et al. | |
| 2013/0167078 | A1 * | 6/2013 | Monnig | G06F 3/0484 715/800 |
| 2013/0174084 | A1 * | 7/2013 | Lord | G06F 19/325 715/781 |
| 2013/0207942 | A1 * | 8/2013 | Imai | G09G 5/003 345/204 |
| 2014/0063042 | A1 * | 3/2014 | Hernandez | G06F 8/38 345/592 |
| 2014/0253802 | A1 * | 9/2014 | Clift | H04N 5/4403 348/564 |
| 2014/0282232 | A1 * | 9/2014 | Oh | G06F 3/0488 715/800 |
| 2014/0365889 | A1 * | 12/2014 | Lipman | H04L 65/403 715/719 |
| 2016/0077677 | A1 * | 3/2016 | Valdes | G06F 17/30849 715/719 |

FOREIGN PATENT DOCUMENTS

| | | |
|---|---|---|
| JP | H0750751 A | 2/1995 |
| JP | 2008028876 A | 2/2008 |
| JP | 2012501015 A | 1/2012 |
| JP | 2012138750 A | 7/2012 |
| JP | 2012230217 A | 11/2012 |
| JP | 2012234274 A | 11/2012 |
| WO | 0159974 A2 | 8/2001 |

* cited by examiner

SIMULTANEOUSLY DISPLAYING VIDEO DATA OF MULTIPLE VIDEO SOURCES

CROSS-REFERENCE TO PRIOR APPLICATIONS

This application is the U.S. National Phase application under 35 U.S.C. § 371 of International Application No. PCT/EP2014/070421, filed on Sep. 25, 2014, which claims the benefit of European Patent Application No. 13186309.4, filed on Sep. 27, 2013. These applications are hereby incorporated by reference herein.

FIELD OF THE INVENTION

The invention relates to a system and a method for simultaneously displaying video data of multiple video sources on a display. The invention further relates to a workstation and imaging apparatus comprising the system and to a computer program product comprising instructions for causing a processor system to perform the method.

BACKGROUND OF THE INVENTION

It is known to simultaneously display video data of multiple video sources. For example, in the field of video surveillance, it is known to simultaneously display the video data obtained from multiple video cameras on a display. For that purpose, the video data of each of the multiple video sources may be displayed in respective viewports on a display. The viewports may be positioned to simultaneously fit a display area on the display. Another example is the video data of multiple remote desktop sessions being simultaneously displayed on a display of a workstation. Each remote desktop session may be displayed in a separate viewport. The viewports may be tiled adjacently or next to each other on the display.

It is also known to spatially scale the video data of one or more of the multiple video sources to fit the respective viewports on the display. For example, the video data of such a video source may be scaled by applying a spatial scaling filter to the video data. Spatial scaling filters are known per se from the field of video processing. For example, nearest-neighbor interpolation, bilinear interpolation, or higher order interpolation filters may be used. Also, non-filter based approaches may be used such as super-sampling.

SUMMARY OF THE INVENTION

The inventors have recognized that one or more of the multiple video sources may be scaling-sensitive in that spatial scaling of the video data of such video sources may result in undesirable artifacts which may hinder interpretation of the video data. Nevertheless, such spatial scaling may at times be desirable, e.g., to enable multiple video sources to be shown on a limited display area, or a video source to be enlarged to obtain a user's attention.

It would be advantageous to have a system or method for simultaneously displaying video data of multiple video sources on a display, which is able to better handle the display of the video data of such scaling-sensitive video sources to a user.

To better address this concern, a first aspect of the invention provides a system for simultaneously displaying video data of multiple video sources on a display, the system comprising:

a video input for receiving the video data of the multiple video sources;

a display processor for generating display data to display the video data of the multiple video sources in respective viewports on a display, the viewports being positioned to simultaneously fit a display area on the display;

wherein the display processor is arranged for:

i) if needed to fit respective ones of the viewports, spatially scaling the video data of one or more of the multiple video sources to fit said respective viewports, ii) generating a visual indicator for visually indicating when the video data in one of the viewports has been spatially scaled from its native spatial resolution; and iii) omitting or modifying the visual indicator when the video data in the one of the viewports is displayed at its native spatial resolution.

In a further aspect of the invention, a workstation and imaging apparatus is provided comprising the system set forth.

In a further aspect of the invention, a method is provided for simultaneously displaying video data of multiple video sources on a display, the method comprising:

receiving the video data of the multiple video sources;

generating display data to display the video data of the multiple video sources in respective viewports on a display, the viewports being positioned to simultaneously fit a display area on the display;

wherein the generating the display data comprises:

i) if needed to fit respective ones of the viewports, spatially scaling the video data of one or more of the multiple video sources to fit said respective viewports, ii) generating a visual indicator for visually indicating whether the video data in one of the viewports has been spatially scaled from its native spatial resolution; and iii) omitting or modifying the visual indicator (310) when the video data in the one of the viewports is displayed at its native spatial resolution.

In a further aspect of the invention, a computer program product is provided comprising instructions for causing a processor system to perform the method set forth.

The above measures provide a video input for receiving the video data of multiple video sources. Here, the term video data refers to data which is meant to be visually displayed in video form, e.g., as a sequence of moving images. For example, the video data may be obtained from a video camera, a remote desktop session to a workstation, etc. The video input receives at least the video data of a first video source and a second video source. Moreover, a display processor is provided for generating display data. When displayed on a display, the display data provides simultaneous display of the video data of the multiple video sources in respective viewports on a display. Here, the term 'viewport' refers to a viewing region on the display for viewing the video data of a video source.

For example, the video data of the first video source may be displayed in a first viewport on the display and the video data of the second video source may be displayed in a second viewport on the display. The viewports may be positioned next to each other to fit a display area on the display, e.g., by tiling or otherwise arranging the viewports. For example, the viewports may form an arrangement which is shown within a reserved display area on the display. Another example is that the viewports may be positioned adjacently to fit the entire display area of the display.

The display processor is arranged for performing the following actions. Here, the actions are performed on the basis of the display processor generating the appropriate display data, i.e., by generating the display data to show a result of said actions. The display processor is arranged for, if needed for the video data of one or more of the multiple video sources to fit one or more respective viewports, spatially scaling the video data of the one or more of the multiple video sources to fit said respective viewports. Said need may be due to the video data having a spatial resolution which does not match the spatial resolution of the respective viewport on the display. As such, the video data of the respective viewports may need to be appropriately scaled, i.e., by spatially up-scaling or down-scaling the video data.

The display processor is further arranged for generating a visual indicator for visually indicating whether video data in one of the viewports on the display has been spatially scaled from its native spatial resolution. Here, the term 'visual indicator' refers to a graphical element such as a graphical symbol or text. Moreover, the term 'native spatial resolution' refers to the spatial resolution of the video data before scaling, i.e., the spatial resolution of the video data as received by the video input. Accordingly, the native spatial resolution may correspond to the number of pixels, voxels or other image elements which make up the video data along its spatial dimensions.

For example, the video data may be comprised of moving images each having a spatial resolution of 1920 pixels horizontally by 1080 pixels vertically. Accordingly, the native spatial resolution of the video data may be said 1920 pixels by 1080 pixels. Furthermore, the term 'spatially scaled from its native spatial resolution' refers to the video data being scaled to a spatial resolution which differs from the native spatial resolution. For example, in order to fit the viewport on the display, the video data of the respective video source may be downscaled to 640 by 360 pixels.

More specifically, the display processor is arranged for generating the visual indicator when the video data in the one of the viewports has been spatially scaled from its native spatial resolution, and omitting or modifying the visual indicator when the video data in the one of the viewports has not been spatially scaled from its native spatial resolution.

The visual indicator is thus a binary-type indicator in that it may be provided only when the video data in the one of the viewports has been spatially scaled from its native spatial resolution and otherwise be omitted, or provided in two different forms, namely in one form when the video data in the one of the viewports has been spatially scaled from its native spatial resolution and in another, i.e., modified, form when the video data in the one of the viewports has not been spatially scaled from its native spatial resolution.

By generating the visual indicator, the user is provided with a visual indication of whether video data in one of the viewports has been spatially scaled from its native spatial resolution. Effectively, the visual indicator provides the user with a visual indication that the video data in one of the viewports may comprise undesirable artifacts which may hinder interpretation of the video data. In response to being shown such a visual indicator, the user may then entirely avoid interpreting the video data, or avoid interpreting specific details of the video data which may constitute or be effected by said undesirable artifacts.

The inventors have recognized that the above system obtains a particularly well-suited compromise between entirely avoiding spatially scaling of scaling-sensitive video sources, thereby severely limiting the available options for their display, and simply spatially scaling such scaling-sensitive video sources as if they were not scaling-sensitive. Namely, by providing the visual indicator as part of the display data, the system warns the user that the video data in one of the viewports may comprise undesirable artifacts which may hinder interpretation of the video data, but ultimately leaves the choice to the user.

Advantageously, the binary-type visual indicator provided in accordance with the invention is interpretable by the viewer with little or no cognitive burden, so that it is relatively easy for a user to discern whether indeed video data in one or more viewports may comprise artifacts or not.

Optionally, the system further comprises a user interface subsystem for enabling a user to indicate a resize action to be applied to a selected one of the viewports, and wherein the display processor is arranged for:

based on the resize action, resizing one or more viewports, the one or more viewports comprising at least said selected viewport; and spatially scaling the video data of one or more of the multiple video sources to fit the respective one or more resized viewports By providing a user interface subsystem, the user is enabled to interact with the system, and in particular, to indicate a resize action to be applied to a selected one of the viewports. For example, the user interface may enable the user to indicate the resize action by operating a user input device to control a pointer shown on the display. Having received an indication of the resize action, i.e., a request, the display processor then resizes one or more of the viewports, with the one or more viewports comprising at least said selected viewport. In doing so, the display processor spatially scales the video data of one or more of the multiple video sources to fit the respective one or more resized viewports. Accordingly, the user is enabled to resize a selected viewport while being provided with a visual indication whether such resizing resulted in the video data in one of the viewports, e.g., the selected viewport or a non-selected viewport, being spatially scaled from its native spatial resolution.

Optionally, the resize action is a restore action, and the display processor is arranged for carrying out the restore action by resizing the selected viewport to display the video data at its native resolution. The resize action as indicated by the user causes the display processor to resize the selected viewport, thereby enabling the video data in the selected viewport to be displayed at its native spatial resolution while fitting the selected viewport. Accordingly, the user is enabled to restore the video data in the selected viewport to its native spatial resolution. Advantageously, the user is provided with a display of the video data which is free of undesired artifacts with may otherwise appear in the video data due to the spatial scaling, thereby enabling unhindered interpretation of the video data.

Optionally, the user interface subsystem is arranged for enabling the user to indicate the restore action by selecting the visual indicator. Selecting the visual indicator is a particularly intuitive mechanism for the user to request the restore action since the user already associates the visual indicator with (a lack of) display at the native spatial resolution. Advantageously, the cognitive burden of requesting the restore action is reduced.

Optionally, the display processor is arranged for resizing or rearranging non-selected ones of the viewports as part of the resize action to free up a portion of the display area for enabling the resizing of the selected viewport. By resizing or rearranging non-selected ones of the viewports as part of the resize action, the display processor is enabled to free up a portion of the display area for the selected viewport to be resized, whilst still being able to display other viewports.

Advantageously, the user maintains a view of the other video data while being shown the resized version of the selected viewport.

Optionally, the display processor is arranged for animating said resizing or said rearranging. Animating the resizing or rearranging of the selected and/or non-selected viewports helps the user in understanding how the display of viewports is adapted to enable the video data in the selected viewport to be displayed at its native spatial resolution.

Optionally, the user interface subsystem is arranged for enabling the user to indicate the resize action by moving a common boundary of the selected viewport and another viewport. Moving a common boundary is a particularly intuitive mechanism for the user to request the resize action. Advantageously, the moving of the common boundary indicates to the display processor at which viewport's expense the selected viewport is to be resized. In particular, if the display processor needs to resize one or more other viewports as part of the resize action to free up a portion of the display area for enabling the resizing of the selected viewport, the moving of the common boundary indicates to the display processor which other viewport can be resized, namely the viewport sharing the common boundary.

Optionally, the display processor is arranged for displaying the visual indicator in visual association with the one of the viewports. Here, the term 'visual association' refers to the visual indicator being displayed such that the user can visually associate the visual indicator with the one of the viewports. Accordingly, the user can easily recognize which one(s) of the viewports show(s) video data which has been spatially scaled from its native spatial resolution. For example, the display processor may include the visual indicator in a title bar of the viewport, as an overlay within the viewport, etc.

Optionally, one or more of the multiple video sources are marked as being scaling-sensitive, and the display processor is arranged for generating the visual indicator only for the viewports which display the video data of said scaling-sensitive video sources. The multiple video sources may be marked as being scaling-sensitive, e.g., by means of metadata included in the video data from which the display processor can deduct such marking, by means of said marking available as manually generated data, etc. Accordingly, the display processor may only generate the visual indicator for the marked video sources. Advantageously, the user is not bothered with a visual indicator for viewports where the scaling of the video data does not materially affect the display of the video source.

Optionally, the multiple video sources comprise a workstation or an imaging apparatus connected to the system via a remote desktop session. Optionally, the remote desktop session shows a medical image or a medical signal.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
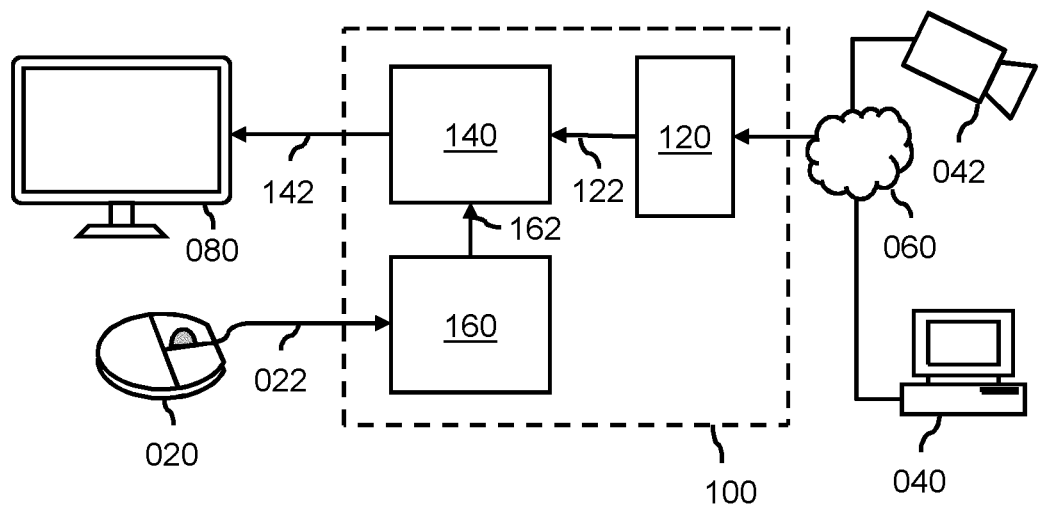
FIG. 1 shows a system for simultaneously displaying video data of multiple video sources in respective viewports on a display, wherein the system further comprises a user interface subsystem for enabling a user to interact with the system.

FIG. 1 shows a system 100 for simultaneously displaying video data of multiple video sources on a display. The system 100 comprises a video input 120 for receiving the video data of the multiple video sources. Here, the term 'video input' refers to an input which is suitable for receiving the video data. Accordingly, the video input may be constituted by, e.g., a network interface when receiving the video data via a network, or in general be of any other suitable type. By way of example, FIG. 1 shows the video input 120 being connected to a workstation 040 and a video camera 042 via a network 060 such as a Local Area network (LAN), Wide Area Network (WAN) or the Internet. Accordingly, the video input 120 may receive video data from the video camera 042 and video data from the workstation 040, the latter being constituted by, e.g., remote desktop session data. In this respect, it is noted that the multiple video sources 040, 042 may be external video sources in that they may have to stream or otherwise send the video data to the video input 120.

The system 100 further comprises a display processor 140 for generating display data 142 to display the video data of the multiple video sources in respective viewports on a display. For that purpose, the display processor 140 is shown to receive the video data 122 of the multiple video sources from the video input 120. In addition, the display processor 140 is shown to provide the display data 142 to an external display 080.

The display processor 140 is arranged for being able to perform the following actions during operation of the system 100. It is noted that said actions are performed on the basis of the display processor 140 generating the appropriate display data 142. Firstly, the viewports are positioned to simultaneously fit a display area on the display 080. Moreover, if needed to fit respective ones of the viewports, the video data 122 of one or more of the multiple video sources is spatially scaled to fit the respective viewports. Further, the display processor 140 is able to generate a visual indicator for visually indicating whether the video data in one of the viewports has been spatially scaled from its native spatial resolution.

FIG. 1 further shows an optional aspect of the present invention, in that the system 100 may comprise a user interface subsystem 160 for enabling a user to indicate a resize action to be applied to a selected one of the viewports. For that purpose, FIG. 1 shows the user interface subsystem 160 receiving user input data 022 from a user input device which is operable by the user, e.g., a mouse 020, keyboard or touch screen, and outputting data 162 indicating the resize action to the display processor 140. Furthermore, according to this optional aspect of the present invention, the display processor 140 may be arranged for, based on the resize action, resizing one or more viewports, with the one or more viewports comprising at least said selected viewport, and spatially scaling the video data 122 of one or more of the multiple video sources to fit the respective one or more resized viewports.

It is noted that the operation of the display processor 140 and the user interface subsystem 160 will be further explained with reference to FIGS. 4a-6.

Figure 2:
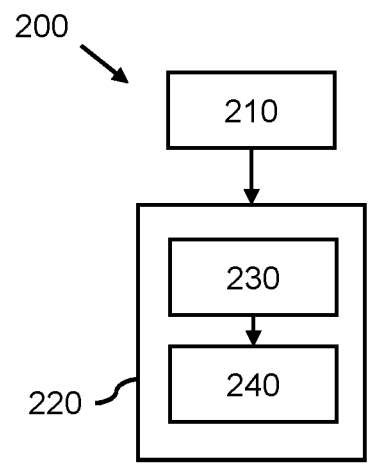
FIG. 2 shows a method for simultaneously displaying the video data of multiple video sources in respective viewports on a display.

FIG. 2 shows a method 200 for simultaneously displaying the video data of multiple video sources on a display. The method 200 may correspond to an operation of the system of FIG. 1. However, this is not a limitation, in that the method 200 may also be performed in separation of the system, e.g., using a different system or device.

The method 200 comprises, in a first step titled "RECEIVING VIDEO DATA OF MULTIPLE VIDEO SOURCES", receiving 210 the video data of the multiple video sources. The method 200 further comprises, in a second step titled "GENERATING DISPLAY DATA TO DISPLAY THE MULTIPLE VIDEO SOURCES", generating 220 display data to display the video data of the multiple video sources in respective viewports on a display, the viewports being positioned to simultaneously fit a display area on the display. As part of the second step 220, the method comprises, in a further step titled "SPATIALLY SCALING VIDEO DATA", if needed to fit respective ones of the viewports, spatially scaling 230 the video data of one or more of the multiple video sources to fit said respective viewports. As part of the second step 220, the method further comprises, in a further step titled "GENERATING VISUAL INDICATOR INDICATING SPATIALLY SCALED VIDEO DATA", generating 240 a visual indicator for visually indicating whether the video data in one of the viewports has been spatially scaled from its native spatial resolution.

Figure 3:
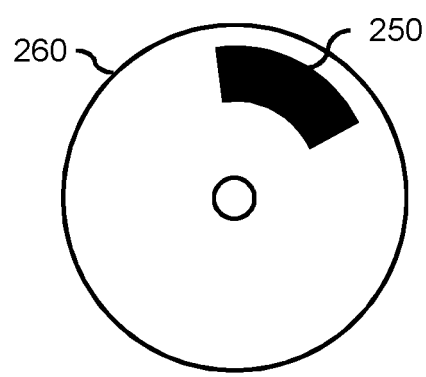
FIG. 3 shows a computer program product for performing the method.

FIG. 3 shows a computer program product 250 comprising instructions for causing a processor system to perform the aforementioned method of FIG. 2. The computer program product 250 may be comprised on a computer readable medium 260, for example in the form of a series of machine readable physical marks and/or as a series of elements having different electrical, e.g., magnetic, or optical properties or values.

An operation of the system and method may be further explained as follows.

Figure 4A:
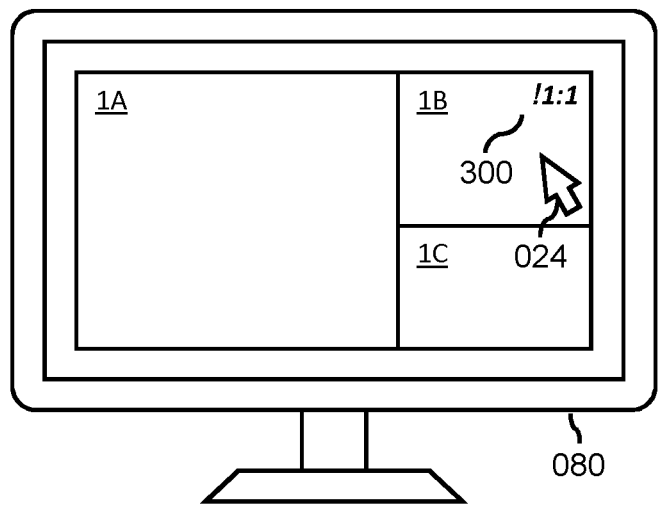
FIG. 4a shows the video data of multiple video sources being displayed in respective viewports on a display, with one of the viewports comprising a visual indicator indicating that the video data has been spatially scaled from its native spatial resolution.

FIG. 4a shows the video data of multiple video sources being displayed in respective viewports 1A-1C on a display 080, namely the video data of a first video source being shown in a first viewport 1A, the video data of a second video source being shown in a second viewport 1B, and the video data of a third video source being shown in a third viewport 1C. It is noted that in this and the following examples, the video data shown in each respective viewport 1A-1C is assumed to substantially fill out said viewport, e.g., by being appropriately spatially scaled, and thus is not separately referenced with reference numbers. Moreover, in the example of FIG. 4a, the viewports 1A-1C are shown to be adjacently positioned to fit a display area on the display 080, being in this case the entire display area of the display. It is noted that the viewports 1A-1C may not need to be adjacently positioned but rather may have one or more empty or otherwise filled display areas between them.

In accordance with the present invention, the second viewport 1B is shown to comprise a visual indicator 300 indicating that the video data in the second viewport 1B has been spatially scaled from its native spatial resolution. For example, the video data may have been spatially downscaled to fit the second viewport 1B. In this respect, it is noted that the term 'fit' refers to the video data, after being spatially scaled, having spatial dimensions which substantially or exactly equal those of the display area of the respective viewport on the display 080. For example, if the second viewport 1B occupies 640 by 360 pixels on the display, the video data may have been spatially downscaled to these dimensions.

In the example of FIG. 4a, the visual indicator 300 is shown in the form of text, namely "! 1:1", with the "1:1" representing the video data being displayed at its native resolution, i.e., indicating a one-to-one mapping of pixels or other image elements of the video data to respective pixels or image elements of the display data or display. Moreover, the exclamation mark "!" denotes that the video data is currently not displayed at its native resolution, thereby effectively providing a warning to the user. However, the visual indicator may also take any other suitable form, and in particular may indicate either or both of the following options, namely that the video data is currently displayed at its native resolution or that the video data is currently not displayed at its native resolution. It will be appreciated that both constitute complementary options which effectively serve the same purpose in that a visual indication according to the present invention may be provided to a user both by a presence of a visual indicator as well as by an absence of such a visual indicator.

Furthermore, in the example of FIG. 4a, the visual indicator 300 is shown in visual association with one of the viewports, namely by being comprised as an overlay over the video data in the second viewport 1B. Alternatively, the visual indicator 300 may be shown without an explicit visual association with the one of the viewports, e.g., by being centrally shown. In this case, the visual indicator 300 may nevertheless enable the user to identify a viewport which does (not) display video data at its native resolution, e.g., by being provided as text which refers to a number, position or other characteristic of the viewport.

FIG. 4a further shows a pointer 024 which may be controllable by the user, e.g., by operating a user input device. The system may be arranged for enabling the user to indicate a resize action to be applied to a selected one of the viewports via the pointer 024. For example, the user may indicate the resize action by moving, e.g., via drag-and-dropping, a common boundary of the selected viewport and another viewport. The system may also be arranged for enabling the user to indicate a rearrange action to be applied to one or more of the viewports via the pointer 024. Effectively, the system may enable the user to interactively control the arrangement of the viewports by adjusting their size and/or relative position.

Figure 4B:
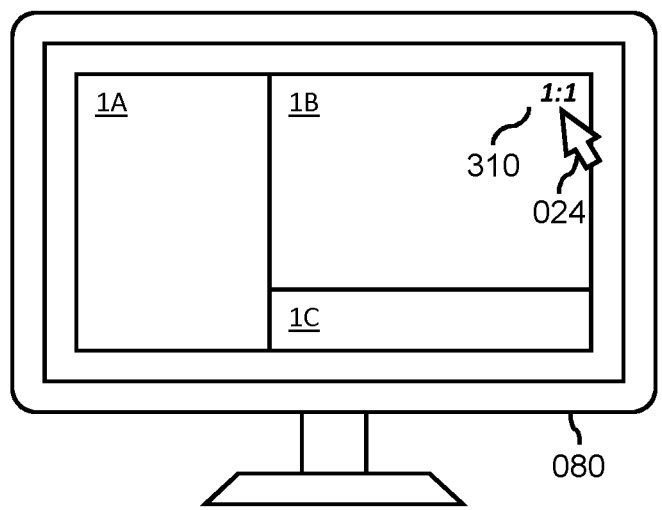
FIG. 4b shows a result of the user selecting the visual indicator, namely that the viewport is resized to display the video data at its native resolution.

In the example of FIGS. 4a-4b, the user is shown to indicate a restore action to be applied a selected one of the viewports. The restore action is a form of a resize action, as will be further explained. In particular, FIG. 4b shows a result of the user having selected the visual indicator 300 using the pointer 024, e.g., by clicking on it, thereby establishing a request for the restore action to be applied to the second viewport 1B, and in particular, to its video data. The display processor may be arranged for carrying out the restore action by resizing the second viewport 1B to enable display of the video data at its native resolution. Accordingly, FIG. 4b shows the second viewport 1B being increased in size to display the video data at its native resolution. FIG. 4b further shows a result of the following. The display processor may be arranged for resizing or rearranging non-selected ones of the viewports as part of the resize action to free up a portion of the display area for enabling the resizing of the selected viewport. Accordingly, in the example of FIG. 4b, the first viewport 1A and its video data and the third viewport 1C and its video data have been shown to be resized, yielding a first viewport 1A and a third viewport 1C which have both been reduced in size.

FIG. 4b further shows the display processor having generated a different visual indicator 310, namely the text "1:1" denoting that the video data is currently displayed at its native resolution. Accordingly, compared to the visual indicator 300 of FIG. 4a, the exclamation mark "!" has been removed to indicate that the video data is not being scaled anymore from its native resolution. The visual indicator 310 thereby effectively provides a confirmation to the user that the video data is thought to be free of scaling-artifacts.

Figure 5A:
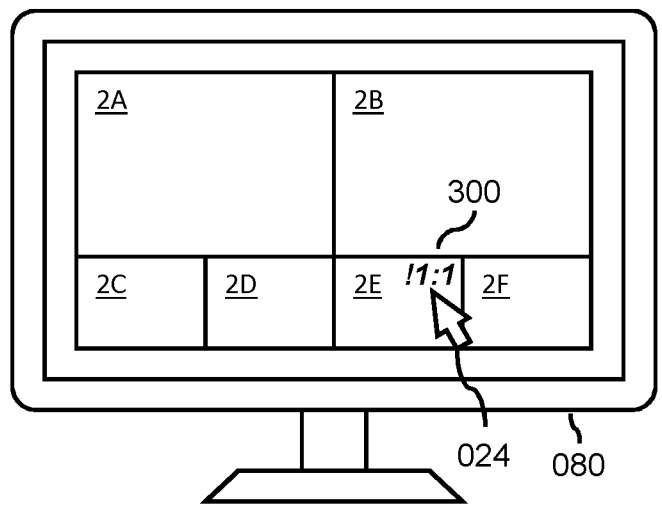
FIG. 5a is a similar example as FIG. 4a but shows more viewports.

FIG. 5a shows a similar example as FIG. 4a, but showing more viewports, namely six viewports 2A-2F displaying respective video data. Here, one of the viewports 2E is shown to comprise a visual indicator 300 comprising the text "! 1:1", thereby denoting that the video data in the viewport 2E is currently not displayed at its native resolution. Like in the example of FIGS. 4a-4b, the user may use the pointer 024 to provide a request for the restore action to be applied to this viewport, e.g., by selecting the visual indicator 300.

Figure 5B:
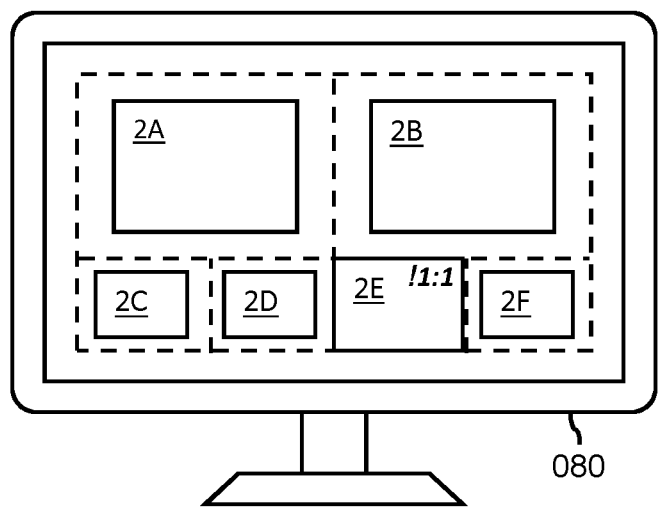
FIG. 5b-5d shows an animated sequence resulting from the user selecting the visual indicator in one of the viewports, namely that the viewport is resized to display the video data at its native resolution and that other viewports are resized and/or rearranged to free up a portion of the display area, and with said resizing and rearranging being animated.
Figure 5C:
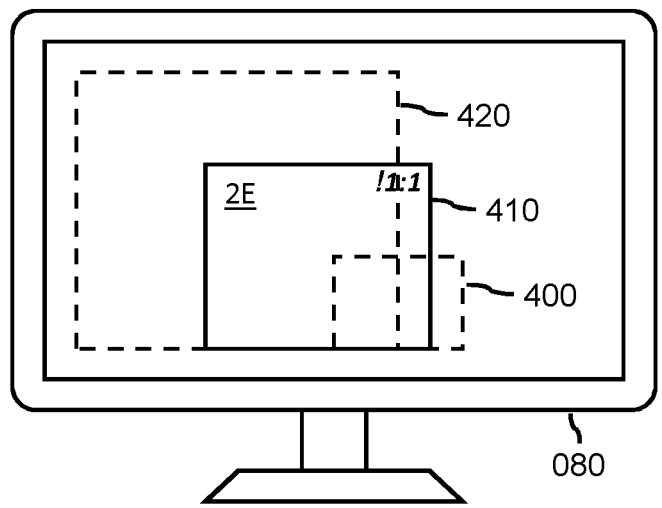
Figure 5D:
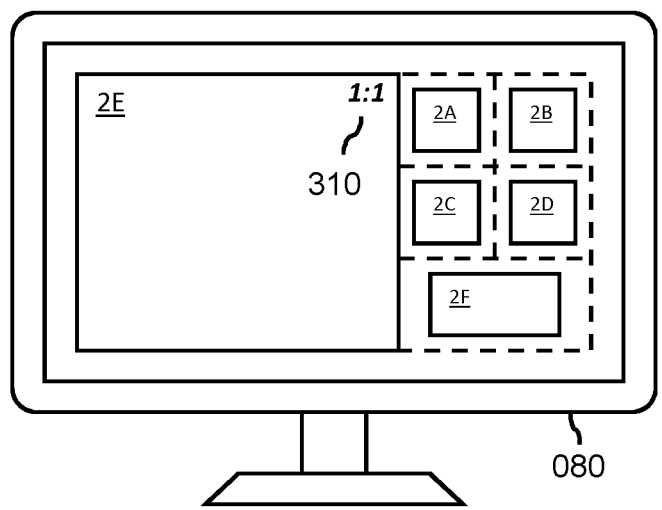

FIG. 5b-5d shows an animated sequence resulting from the user selecting the visual indicator 300, the animated sequence showing the selected viewport 2E being resized to display the video data at its native resolution and the other viewports 2A-2D, 2F being resized and rearranged to free up a portion of the display area. The animated sequence may be generated by the display processor, e.g., by generating appropriate display data over time.

FIG. 5b shows a first part of the sequence, illustrating the other viewports 2A-2D, 2F being reduced in size to free up a portion of the display area. Although not entirely shown in FIG. 5b, this part of the sequence may serve to deemphasize or hide the other viewports 2A-2D, 2F. It is noted that also other animations may be used to remove viewports from the display area. FIG. 5c shows a next part of the sequence, illustrating the selected viewport 2E being increased in size from its original size 400 via an intermediate size 410 to a final size 420, the latter enabling the video data to be displayed at its native resolution.

Figure 5E:
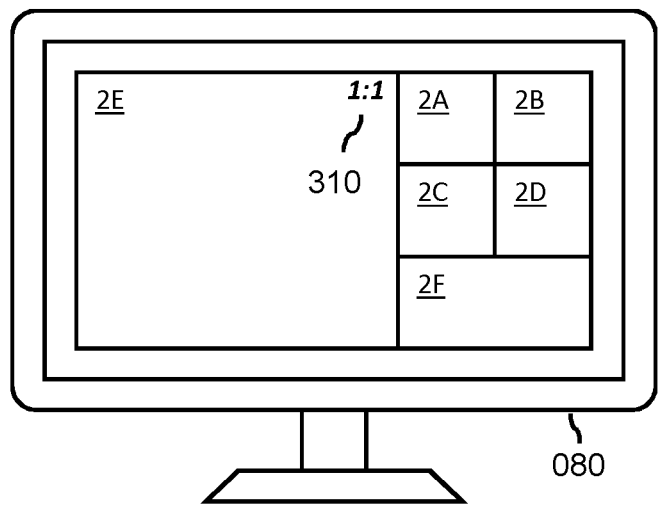
FIG. 5e shows a new arrangement of the viewports in which the selected viewport has been resized to display the video data at its native resolution.

FIG. 5d shows a next part of the sequence, illustrating the video data in the selected viewport 2E being shown at its native resolution. To indicate this fact to the user, a different visual indicator 310 is shown, namely comprising the text "1:1" instead of the text "! 1:1", i.e., without the exclamation mark "!". FIG. 5d further illustrates the other viewports being again increased in size to occupy the remaining display area. It is noted that also other animations may be used to reintroduce viewports in the display area. FIG. 5e finally shows the new arrangement of the viewports 2A-2F in which the selected viewport 2E has been resized to display the video data at its native resolution and the other viewports have been resized and rearranged around the selected viewport 2E, i.e., in the remaining display area.

In the above examples, the visual indicator is shown to be provided for only one of the viewports. It will be appreciated that the visual indicator may be provided for a number or all of the viewports in which video data has been spatially scaled from its native spatial resolution, or in the complementary case, has not been spatially scaled. Additionally or alternatively, one or more of the multiple video sources may be marked as being scaling-sensitive, and the display processor may be arranged for generating the visual indicator only for the viewports which display the video data of said scaling-sensitive video sources. For example, the video data from a remote desktop session may constitute a scaling-sensitive video source, particularly when the remote desktop session is to a medical workstation or medical imaging apparatus, thereby being likely to show a medical image or a medical signal.

Figure 6:
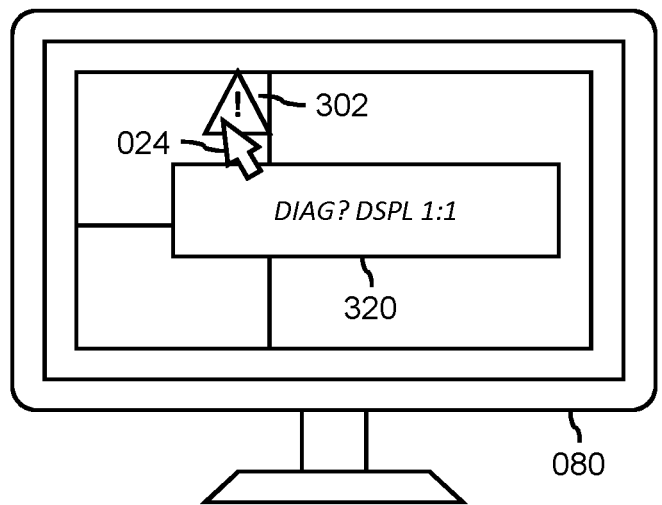
FIG. 6 shows a warning dialog indicating that for diagnostic purposes the video data of a selected viewport should be display at its native resolution.

FIG. 6 shows an alternative visual indicator 302, being a graphical element comprising a triangle and an exclamation mark placed within the triangle. The visual indicator 302 may provide a hover text, also referred to as mouse-on text, in that when the pointer 024 hovers over the visual indicator 302, the display processor may generate a warning dialog 320 warning the user via the text "DIAG? DSPL 1:1" that for diagnostic purposes, the video data of the viewport should be display at its native resolution.

In general, the display processor may be arranged for generating the visual indicator for visually indicating whether the video data in one of the viewports has been spatially scaled by more than a certain amount from its native spatial resolution. For example, the visual indicator may indicate that the spatial scaling is by more than 5%, e.g., exceeds 105% of the native spatial resolution or drops below 95% of the native spatial resolution.

It will be appreciated that the present invention may be advantageously applied in next generation user interfaces, for example in a so-termed flexible viewing workspot, which may enable viewing and control of several external video sources from one working position, e.g., with one mouse. For that purpose, multiple viewports may be provided each showing a different external video source, with the viewports being positioned in an arrangement on the screen and being freely resizable by the user, e.g., by mouse.

The present invention addresses the following disadvantageous consequence of displaying multiple external video sources in an arrangement of viewports and enabling the user to freely resize the viewports, namely in that the video data video source may be shown at a size other than its native resolution, and as such, may be scaled to fit in the arrangement of the viewports on screen. For certain external video sources, especially external video sources showing medical images or hemodynamic or electrophysiological signals, applying scaling to the video data of the video source may lead to undesirable artifacts in the medical images/medical signals, with potentially negative influence on diagnosis and/or treatment of the patient. It will be appreciated that the present invention enables the user to be warned about such undesirable artifacts, and optionally to avoid such undesirable artifacts by requesting a restore action to be applied to a selected viewport.

It will be appreciated that displaying video data at its native resolution may comprise cropping the video data to fit the respective viewport without having to spatially scale the video data. Accordingly, additionally or alternatively to resizing a selected viewport to display the video data at its native resolution, the video data may also be cropped.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for simultaneously displaying video data of multiple video sources on a display, the system comprising:
   a video input circuit for receiving the video data of the multiple video sources, wherein the video data of at least one of the multiple video sources is explicitly marked as being scaling-sensitive;
   a display processor for generating display data to display the video data of the multiple video sources in respective viewports on a display, the viewports being sized and positioned to simultaneously fit a display area on the display;
   wherein the display processor is arranged for:
      if needed to fit the size of respective ones of the viewports, automatically spatially scaling the video data of one or more of the multiple video sources to fit said respective viewports, and
      only for each video data that is explicitly marked as being scaling-sensitive and has been spatially scaled, generating a visual indicator for visually indicating that the scaling-sensitive video data has been spatially scaled from its native spatial resolution; and
      concurrently displaying the visual indicator while displaying the scaling-sensitive video data that has been spatially scaled.

2. The system according to claim 1, further comprising a user interface subsystem for enabling a user to indicate a resize action to be applied to a selected one of the viewports, and wherein the display processor is arranged for:
   based on the resize action, resizing one or more viewports, the one or more viewports comprising at least said selected viewport; and
   spatially scaling the video data of one or more of the multiple video sources to fit the respective one or more resized viewports.

3. The system according to claim 2, wherein the resize action is a restore action, and wherein the display processor is arranged for carrying out the restore action by resizing the selected viewport to display the video data at its native resolution.

4. The system according to claim 3, wherein the user interface subsystem is arranged for enabling the user to initiate the restore action by selecting the visual indicator.

5. The system according to claim 2, wherein the display processor is arranged for resizing or rearranging non-selected ones of the viewports as part of the resize action to free up a portion of the display area for enabling the resizing of the selected viewport.

6. The system according to claim 5, wherein the display processor is arranged for animating said resizing or said rearranging.

7. The system according to claim 2, wherein the user interface subsystem is arranged for enabling the user to initiate the resize action by moving a common boundary of the selected viewport and another viewport.

8. The system according to claim 1, wherein the display processor is arranged for displaying the visual indicator in visual association with the scaling sensitive video data.

9. The system according to claim 1, wherein the multiple video sources comprise a workstation or an imaging apparatus connected to the system via a remote desktop session.

10. The system according to claim 9, wherein the remote desktop session shows a medical image or a medical signal.

11. A workstation or imaging apparatus comprising the system according to claim 1.

12. A method for simultaneously displaying video data of multiple video sources on a display, the method comprising:
receiving the video data of the multiple video sources, wherein the video data of at least one of the multiple video sources is explicitly marked as being scaling-sensitive;
storing at least some of the video data in a memory;
generating display data to display the video data of the multiple video sources in respective viewports on a display, the viewports being sized and positioned to simultaneously fit a display area on the display;
wherein the generating the display data comprises:
if needed to fit the size of respective ones of the viewports, automatically spatially scaling the video data of one or more of the multiple video sources to fit said respective viewports and,
only for each video data that is explicitly marked as being scaling-sensitive and has been spatially scaled, generating a visual indicator for visually indicating that the scaling-sensitive video data has been spatially scaled from its native spatial resolution.

13. A non-transitory computer-readable medium that, when executed by a processor, causes the processor to:
receive video data from each of a plurality of video sources, wherein the video data of at least one of the multiple video sources is explicitly marked as being scaling-sensitive;
store at least some of the video data in a memory element;
define a corresponding size and position of a plurality of viewports of a display area of a display device for simultaneously displaying the video data of each of the plurality of video sources;
generate display data for each view port corresponding to the video data of each of the plurality of video sources based on the defined size of each corresponding viewport,
only for each video data that is explicitly marked as being scaling-sensitive, generate a visual indicator when the generating of the display data included a scaling of the scaling-sensitive video data; and
concurrently displaying the visual indicator while displaying the display data of the scaling-sensitive video data.

14. The medium of claim 13, wherein the program causes the processor to display the visual indicator in visual association with the corresponding scaling-sensitive video data.

15. The medium of claim 14, wherein the program causes the processor to display the visual indicator when a user directs an indicator to the at least one view port.

16. The medium of claim 13, wherein the program causes the processor to:
receive a resize command from a user;
resize the plurality of viewports in response to the resize command; and
regenerate the display data for each view port corresponding to the video data of each of the plurality of video sources; and
remove the visual indicator if the regenerating of the display data did not include a scaling of the scaling-sensitive video data.

17. The medium of claim 16, wherein the program causes the processor to resize the viewport of the at least one viewport to enable the regeneration of the display data of the at least one viewport without scaling the video data of the at least one viewport.

18. The medium of claim 17, wherein receiving the resize command includes determining that the user has selected the visual indicator.

* * * * *